(12) United States Patent
Park et al.

(10) Patent No.: US 9,552,671 B2
(45) Date of Patent: Jan. 24, 2017

(54) METHOD FOR OPERATING THREE-DIMENSIONAL HANDLER AND TERMINAL SUPPORTING THE SAME

(71) Applicant: Samsung Electronics Co., Ltd., Gyeonggi-do (KR)

(72) Inventors: Kyungdae Park, Seoul (KR); Bonghee Kim, Seoul (KR); Jihye Myung, Gyeonggi-do (KR); Hyebin Park, Seoul (KR); Saegee Oh, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 198 days.

(21) Appl. No.: 13/746,529

(22) Filed: Jan. 22, 2013

(65) Prior Publication Data

US 2013/0187909 A1   Jul. 25, 2013

(30) Foreign Application Priority Data

Jan. 25, 2012   (KR) .................. 10-2012-0007137

(51) Int. Cl.
*G06T 19/00* (2011.01)
*G06F 3/0481* (2013.01)
*G06F 3/0488* (2013.01)

(52) U.S. Cl.
CPC ............. *G06T 19/00* (2013.01); *G06F 3/0488* (2013.01); *G06F 3/04815* (2013.01); *H04M 2250/22* (2013.01)

(58) Field of Classification Search
None
See application file for complete search history.

(56) References Cited

U.S. PATENT DOCUMENTS

| 6,710,788 B1 | 3/2004 | Freach et al. |
| 2005/0024376 A1 | 2/2005 | Gettman et al. |
| 2007/0261001 A1 | 11/2007 | Nagiyama et al. |
| 2008/0215978 A1 | 9/2008 | Bamba |
| 2009/0013275 A1* | 1/2009 | May et al. .................... 715/765 |
| 2009/0228175 A1* | 9/2009 | Borgesson ............. B60K 35/00 701/48 |
| 2010/0083150 A1* | 4/2010 | Nurmi ................. G06F 3/04883 715/764 |
| 2010/0115471 A1 | 5/2010 | Louch et al. |
| 2010/0159995 A1* | 6/2010 | Stallings et al. .............. 455/566 |
| 2010/0169813 A1 | 7/2010 | Chang |
| 2010/0287505 A1* | 11/2010 | Williams ....................... 715/823 |

(Continued)

FOREIGN PATENT DOCUMENTS

| DE | 10-2008-038897 A1 | 2/2010 |
| EP | 1186987 A2 | 3/2002 |

(Continued)

*Primary Examiner* — Andrew G Yang
(74) *Attorney, Agent, or Firm* — Cha & Reiter, LLC.

(57) ABSTRACT

A terminal for supporting an operation of a three-dimensional handler includes: a display unit displaying a three-dimensional handler region having at least one link object and a link object information region outputting link object information in response to a movement or selection of the at least one link object on the three-dimensional handler and outputting the collected link object information in the link object information region.

24 Claims, 7 Drawing Sheets

(56) References Cited

U.S. PATENT DOCUMENTS

| | | | |
|---|---|---|---|
| 2010/0293508 A1* | 11/2010 | Hwang | G06F 3/04886 715/846 |
| 2010/0329642 A1* | 12/2010 | Kam et al. | 386/280 |
| 2011/0047491 A1* | 2/2011 | Hwang et al. | 715/765 |
| 2011/0093815 A1* | 4/2011 | Gobeil | G06F 3/0482 715/825 |
| 2011/0175840 A1 | 7/2011 | Mason | |
| 2011/0231762 A1 | 9/2011 | Toida | |
| 2011/0282537 A1* | 11/2011 | Yamasaki et al. | 701/29 |
| 2011/0302533 A1* | 12/2011 | Stuhr et al. | 715/825 |
| 2012/0240064 A1* | 9/2012 | Ramsay | G06T 11/00 715/762 |
| 2013/0127850 A1* | 5/2013 | Bindon | 345/420 |

FOREIGN PATENT DOCUMENTS

| | | | |
|---|---|---|---|
| EP | 2317423 | A2 | 5/2011 |
| JP | 61-214021 | A | 9/1986 |
| JP | 9-62473 | A | 3/1997 |
| JP | 2003-121568 | A | 4/2003 |
| JP | 2007-500883 | A | 1/2007 |
| JP | 2007-287135 | A | 11/2007 |
| JP | 2008-158782 | A | 7/2008 |
| JP | 2010-152859 | A | 7/2010 |
| WO | 2006-126050 | A1 | 11/2006 |
| WO | 2010/035179 | A2 | 4/2010 |
| WO | 2011/052083 | A1 | 5/2011 |

* cited by examiner

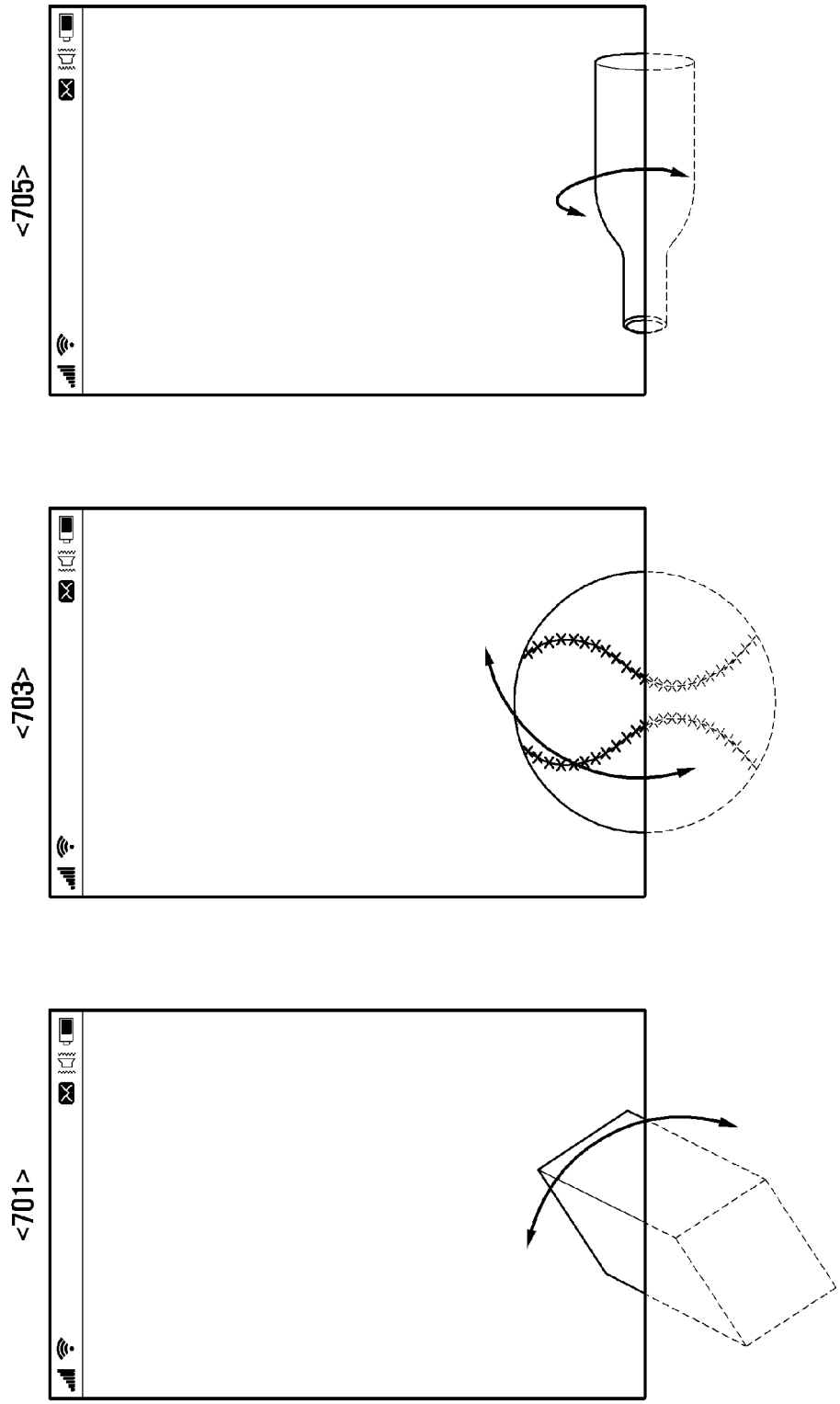

METHOD FOR OPERATING THREE-DIMENSIONAL HANDLER AND TERMINAL SUPPORTING THE SAME

CLAIM OF PRIORITY

This application claims the benefit under 35 U.S.C. §119 (a) of a Korean patent application filed on Jan. 25, 2012 in the Korean Intellectual Property Office and assigned Serial No. 10-2012-0007137, the entire disclosure of which is hereby incorporated by reference.

BACKGROUND OF THE INVENTION

Field of the Invention

The present invention relates to a handler operation of a terminal, and more particularly, to a method of operating a three-dimensional handler capable of searching various information using a three-dimensional object, and a terminal supporting the same.

Description of the Related Art

Since a portable terminal supports a specific user function and becoming smaller for easy handling, it is implemented in many fields. Popular portable terminals these days integrally support various user functions via a display unit to provide a set of user functions to enable a user to confirm various desired information, such as weather information in an idle screen or a menu screen in the form of a widget according to user setting. Accordingly, the user may easily preview weather information of a particular zone previously set using a widget.

However, to confirm weather of another zone, the user must frequently perform a tedious operation which calls an application program associated with a corresponding widget and searches a desired zone from the application program. Accordingly, there is inconvenience for a user to view desired information using the conventional preset scheme. Therefore, there is a need for an improved technique for providing the same information in more intuitive manner.

SUMMARY OF THE INVENTION

The present invention has been made in view of the above problems and provides additional advantages, by providing a method of operating a three-dimensional handler which allows a user to rapidly and conveniently search desired information through attractive, friendly and intuitive interfacing, and a terminal supporting the same.

In accordance with an aspect of the present invention, a terminal for supporting an operation of a three-dimensional handler includes: a display unit displaying the three-dimensional handler in a three-dimensional handler region having at least one link object thereon and displaying a link object information region outputting a link object information corresponding to the at least one link object; and a controller for collecting the link object information in response to a movement of the three-dimensional handler or a selection of the at least one link object on the three-dimensional handler and outputting the collected link object information in the link object information region.

In accordance with another aspect of the present invention, a method for operating a three-dimensional handler includes: displaying the three-dimensional handler in a three-dimensional handler region having at least one link object thereon at one end of a display unit' displaying a link object information region having a link object information corresponding to the at least one link object at the other end of the display unit, and displaying a new link object information in response to a movement of the three-dimensional handler or a selection of the at least one link object on the three-dimensional handler.

BRIEF DESCRIPTION OF THE DRAWINGS

The above features and advantages of the present invention will be more apparent from the following detailed description in conjunction with the accompanying drawings, in which:

FIG. 7 is an exemplary diagram of a screen illustrating various other forms of a globular handler according to an exemplary embodiment of the present invention.

DETAILED DESCRIPTION OF EXEMPLARY EMBODIMENTS

Hereinafter, exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

In the specification, a globular handler is described as a representative example of a three-dimensional handler. However, the present invention is not limited thereto, the three-dimensional handler may be substituted by or incorporated with objects of various forms and sizes.

Figure 1:
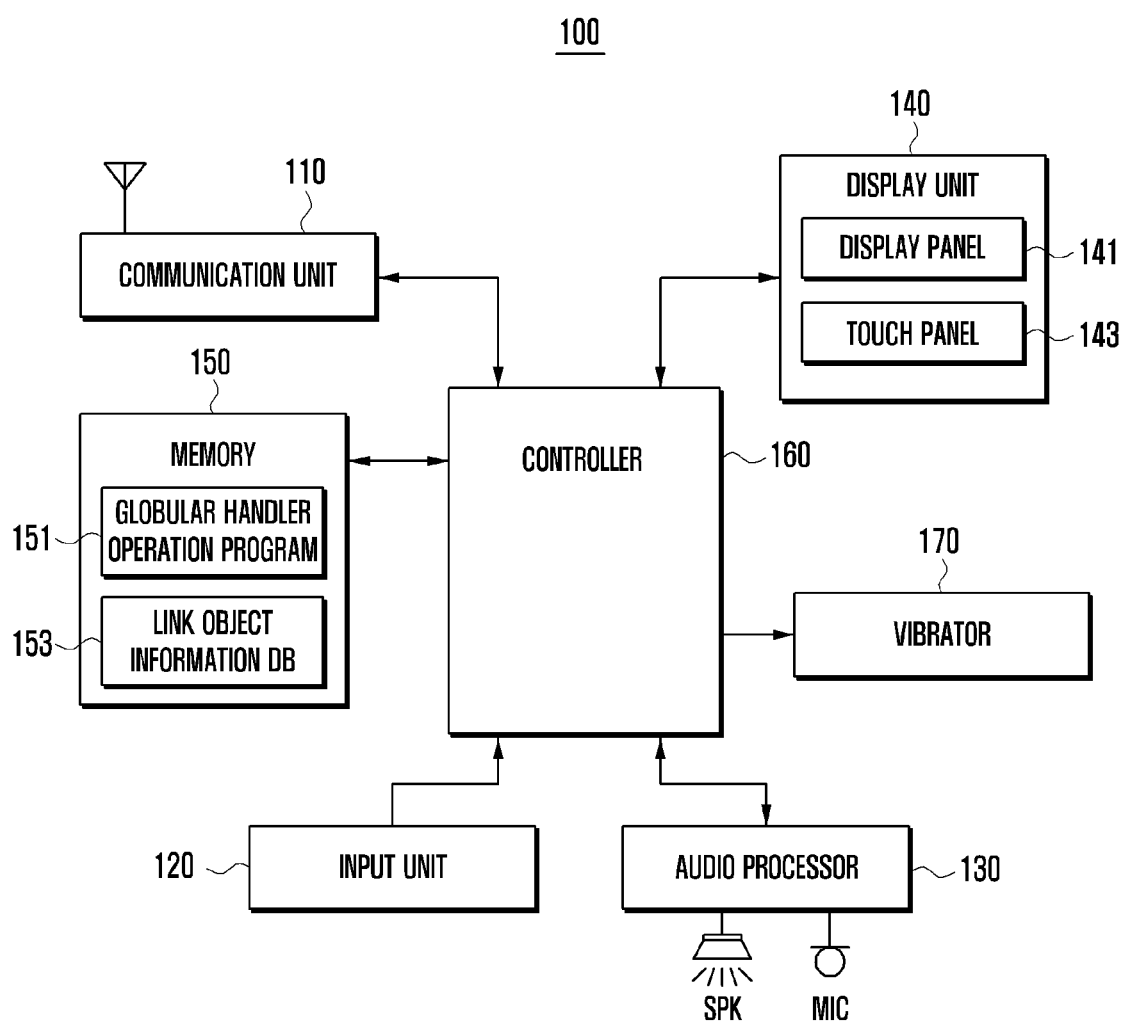
FIG. 1 is a block diagram schematically illustrating a configuration of a terminal supporting an operation of a globular handler according to an exemplary embodiment of the present invention.

FIG. 1 is a block diagram schematically illustrating a configuration of a terminal 100 supporting an operation of a globular handler according to an exemplary embodiment of the present invention.

Referring to FIG. 1, the terminal 100 of the present invention may include a communication unit 110, an input unit 120, an audio processor 130, a display unit 140, a memory 150, and a controller 160.

The terminal 100 of the present invention having a construction mentioned above simultaneously outputs a globular handler region and a link object information region according to operation of a globular handler, such as an image of a globe, on the display unit 140 so that the user may intuitively perform desired information search. In addition, the terminal 100 of the present invention may further include a vibrator 170 for tactile reinforcement for reinforce interactive information search, and operates the vibrator 170 together with operation of the globular handler. Vibration of the vibrator 170 may occur according to rotation of the globular handler. The vibrator 170 may be omitted according to intention of a designer, and accordingly a tactile reinforcing function may not be supported according to a design form of the designer.

The communication unit 110 supports a communication function of the terminal 100. Accordingly, when the terminal 100 according to the present invention does not support a communication function, the communication unit 110 may be omitted from a configuration of the terminal 100. To support a communication function, particularly, a mobile communication function of the terminal 100, the communication unit 110 forms a communication channel with a mobile communication system to support signal transceiving for performing a mobile communication function of the terminal 100. For example, the communication unit 110 may form at least one of an audio service channel, an image service channel, and a data service channel, and support transceiving of a specific signal according to a corresponding service channel. Particularly, the communication unit 110 of the present invention supports a link object information receiving function to output link object information of the display unit 140. That is, the communication unit 110 may form a communication channel with a web server or another terminal providing the link object information, and receive the link object information during a predetermine time period or in real time. Meanwhile, an item arranged to operate the communication unit 110 is selected after a phone-book list information search function is activated during an operation of the globular handler according to the present invention, the communication unit 110 may be activated. When a link object requiring an access to a server is outputted in a globular handler region or indicated and then selected, the communication unit 110 of the present invention may be activated to automatically receive link object information corresponding to a link object.

The input unit 120 generates various input signals necessary for an operation of the terminal 100. The input unit 120 may be configured by various input means such as a key board, a key pad, and a key button. When the display unit 140 is provided as a touch screen, the input unit 120 may be configured in the form of a touch map outputted on the touch screen. Particularly, when the handler operation function is not set as a default function, the input unit 120 of the present invention may generate an input signal for supporting the globular handler operation function under control of the user.

The audio processor 130 may output various audio data set in an operation of the terminal 100, audio data according to a playback of the audio files stored in the memory 150, and audio data received from the outside. The audio processor 130 may support an audio data collecting function. To this end, the audio processor 130 may include a speaker SPK and a microphone MIC. Particularly, the audio processor 130 may output an effect sound or a guide sound set during a procedure of outputting a globular handler region, and an operation effect sound set according to an operation of the globular handler. When a specific link object is outputted in the globular handler region, the audio processor 130 may output a guide sound with respect to corresponding link object information. The output of the effect sound or the guide sound of the audio processor 130 may be omitted according user setting or intention of a designer.

The display unit 140 provides various screen interfaces necessary for an operation of the terminal 100. For example, the display unit 140 supports an idle screen and a menu screen necessary for the operation of the terminal 100. Particularly, the display unit 140 of the present invention may support at least one of a screen of a first embodiment including a globular handler region and a link object information region, and a screen of a second embodiment including a globular handler region, a link object information region, and an indicator region. The display unit 140 may temporarily remove the globular handler region from the screen of the first embodiment according to the user control during implementing the first embodiment. The display unit 140 may temporarily remove at least one of the handler region and the indicator region according to user control during implementing a screen of the second embodiment.

Meanwhile, the display unit 140 may be provided in the form of a touch screen which is an overlapped form of the display panel 141 and the touch panel 143. The display panel 141 may output images and texts corresponding to foregoing various screens and output at least one of the foregoing globular handler region, link object information region, and indicator region. The touch panel 143 may set a touch valid region normally collecting a touch event and a touch invalid region disregarding the collected touch event or not performing collection of the touch event according to characteristics of a screen, and transfer a touch event generated from the touch valid region to the controller 160. If the globular handler is outputted on the display panel 141, the touch panel 143 may set a region on which the globular handler is outputted as the touch valid region. The touch panel 143 may set the indicator region as the touch valid region according to user setting.

The memory 150 may store various basic operating systems necessary for an operation of the terminal 100 and data or an application program corresponding to various user functions, and an algorithm. Particularly, the memory 150 may store a globular handler operation program 151 and a link object information DB 153 for supporting an operation of the globular handler.

The globular handler operation program 151 outputs a globular handler on the display unit 140 and may be a program for supporting various signal processing associated with an operation of the globular handler. The globular handler operation program 151 may include a globular handler display support routine, a globular handler state collecting routine, a link object information output routine according to a globular handler state, and a link object information update routine according to a collected touch event to support an operation of the globular handler. The globular handler operation program 151 may further include an indicator operation routine to support the globular handler according to the second embodiment. The indicator operation routine may include a routine of an indicator corresponding to at least one of various user function items supported by the terminal, a routine of updating link object items outputted on the globular handler according to an input signal generated from the indicator region, and a routine of temporarily removing, transparency or semitransparency-processing, or displaying the indicator region according an operation state of the terminal.

The link object information DB 153 stores various link object information to be outputted to a link object information region according to an operation of the globular handler operation program 151. The link object information DB 153 may store various information according to characteristics of a link object to be outputted on the globular handler region. That is, when a link object associated with a weather widget is outputted on the globular handler region, the link object information DB 153 may store weather information associated with the weather of respective link objects, for example, link objects corresponding to a zone name by countries as link object information. In this case, since a weather being link object information is changed in real time, when a corresponding link object is outputted on a globular handler region, the controller 160 controls the communication unit 110 to update the link object information in real time using an external server or sensor.

Schedule items of a phone-book is outputted on the globular handler region, and the link object information may be detailed phone-book information with respect to a schedule item of the outputted, indicated, or selected phone-book. In this case, the link object information DB 153 may include phone-book information. The link object information DB 153 may store information associated with various user functions providable through the globular handler, update corresponding information periodically or in real time as necessary, and output the updated information to a link object information region according to output, indication, or selection of the link object.

The controller 160 controls various signal flows, and collection and output of information to an operation function of a globular handler according to the embodiment of the present invention. When the globular handler is outputted on a corresponding region, the controller 160 may output information associated with the link object in default or according to a link object outputted on a corresponding region. To achieve this, the controller 160 may include constituent elements as illustrated in FIG. 2.

Figure 2:
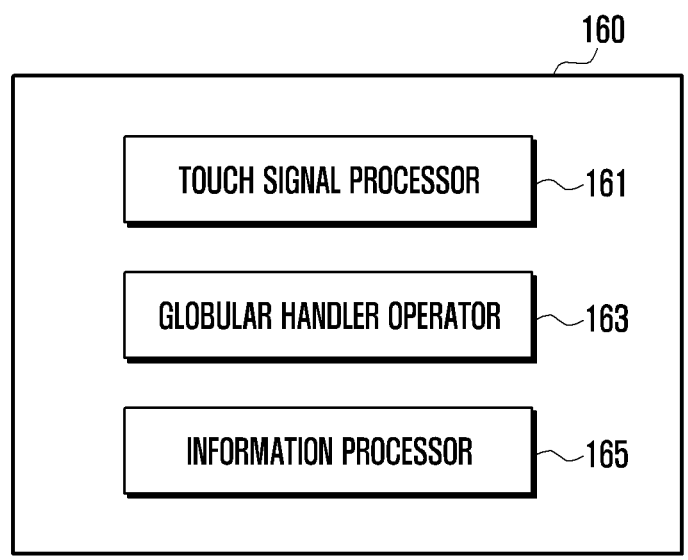
FIG. 2 is a block diagram illustrating a configuration of a controller of FIG. 1 in detail.

FIG. 2 is a block diagram illustrating a configuration of a controller of FIG. 1 in detail.

Referring to FIG. 2, a controller 160 of the present invention includes a touch signal processor 161, a globular handler operator 163, and an information processor 165.

In operation, the touch signal processor 161 sets a touch panel 143 to process a touch signal of the terminal 100, collects the touch signal, determined validity or invalidity of the touch signal, and transfers the determination result to the globular handler operator 163 and the information processor 165. If an input signal for requesting a globular handler operation function is generated, the touch signal processor 161 may set a valid region of the touch panel 143 with respect to a region to which the globular handler is outputted, and sets an information region as a touch invalid region. The touch signal processor 161 may transfer a touch signal generated from a globular handler region to the globular handler operator 163.

When receiving a touch signal in a global handler region from the touch signal processor 161, the global handler operator 163 may control display change with the globular handler and the link object. That is, if a touch event, for example, a flick event or a drag event occurs such that a globular handler is rotated in a predetermined direction at a particular speed corresponding to the touch event.

The globular handler operator 163 may update a link object to be outputted on a globular handler region according to the touch event. A plurality of link objects may be outputted to the globular handler region, and a plurality of link object of different types may be outputted by groups. Accordingly, the globular handler operator 163 may output one of at least one link object group configured by at least one link object and a plurality of link objects according to user setting or an initial design scheme.

The globular handler operator 163 may update a corresponding link object to a different link object of the same user function according to the generated touch event. In this case, the globular handler operator 163 may differently operate an update form of a link object according to a form of an output link object and a location of the generated touch event. When the link object is a globular handler in which one link object is outputted, the globular handler operator 163 outputs a new link object to a specific point of a globular handler region and removes a previous link object according to the generation of a touch event so that a link object may be updated. When the link object is a globular handler in which at least one link object group is outputted, the globular handler operator 163 may update link objects of a specific link object group instructed according to a touch event or update link objects of entire link object groups.

Meanwhile, the globular handler operator 163 may manage an indicator region. That is, the globular handler operator 163 may output at least one indicator indicating at least one type of link object group to an indicator region. The globular handler operator 163 may temporarily remove or semi-transparency process an indicator from the display unit 140 or restore a removed state according to a state of the terminal 100 or a user request. The globular handler operator 163 may replace indicators outputted from an indicator region with other indicators according to a touch event generated from an indicator region. When the indicators are replaced by the other indicators, the globular handler operator 163 may control such that link object groups outputted from a globular handler region are changed corresponding to the changed indicators. In this case, a display form of the globular handler may be also changed.

The information processor 165 outputs link object information corresponding to at least one link object on a link object information region on the display unit 140. When the link object information is outputted to the globular handler region or the instructed or selected link object is changed, the information processor 165 may output link object information corresponding to the change link object to a corresponding region. When the link object group is selected, the information processor 165 may output information about link objects outputted on a current globular handler region or at least partial information of all link objects included in a corresponding link object group to a link object information region. The information processor 165 determines whether a corresponding user function is a function requiring updating information in real time or during a predetermined period while outputting the information. When the corresponding user function is the function requiring updating information in real time or during a predetermined period, the information processor 165 activates the communication unit 110 to receive information in real time or during a predetermined period, and update information of a link object information region based on the received information.

As described above, the terminal supporting an operation function of a globular handler according to the embodiment of the present invention may search or select information using a globular handler to operate the terminal intuitively, conveniently, and rapidly.

Figure 3:
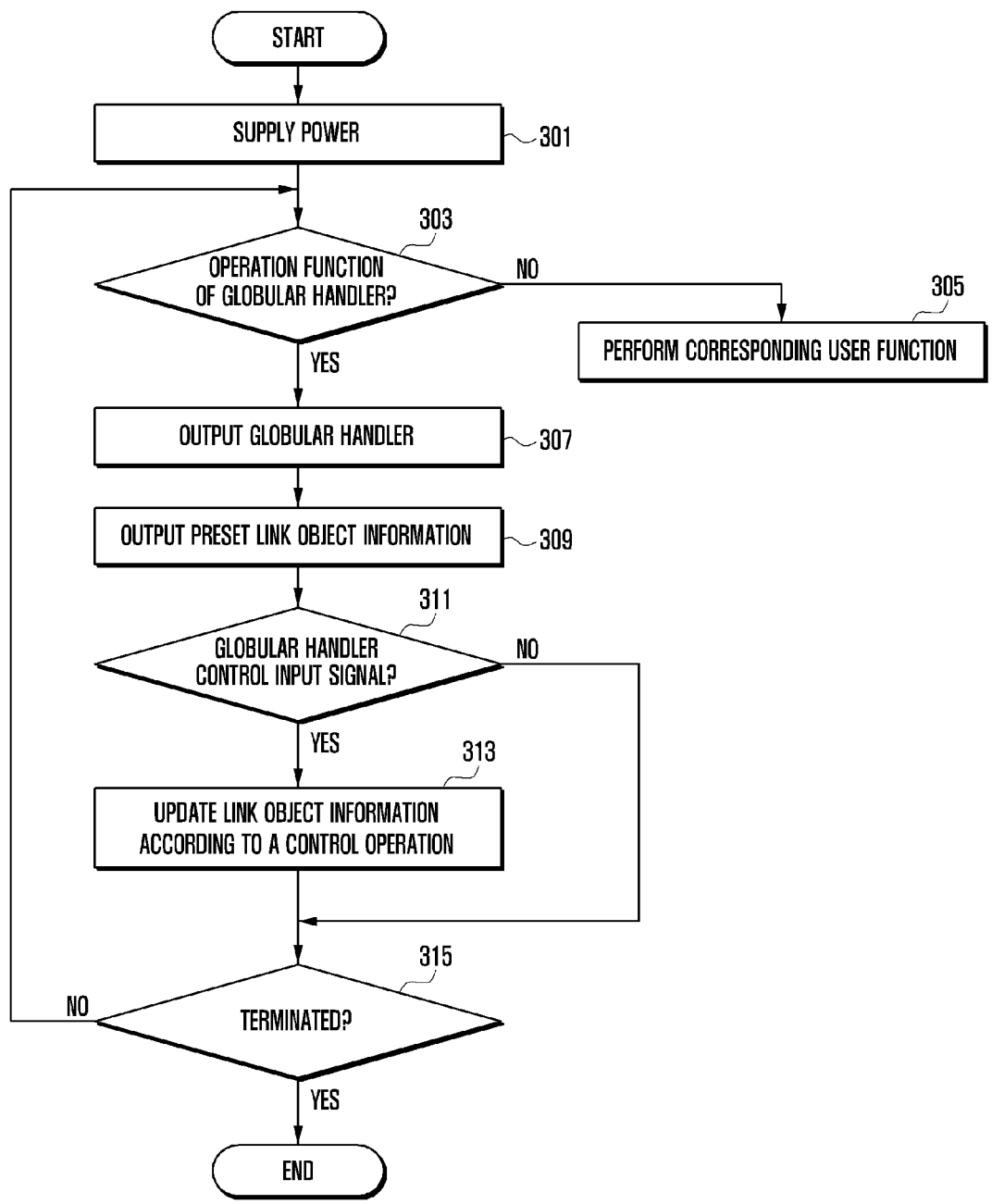
FIG. 3 is a flowchart illustrating a method of operating a globular handler according to an exemplary embodiment of the present invention.

FIG. 3 is a flowchart illustrating a method of operating a globular handler according to an exemplary embodiment of the present invention.

Referring to FIG. 3, a controller 160 of the terminal 100 supplies power of a power supply to respective constituent elements (301). In this procedure, the controller 160 converts power of a power supply such as a battery into power necessary for each constituent element, and supply the converted power to a corresponding constituent element. Particularly, the controller 160 may control power supply to the display unit 140 and control the display unit 140 to output an idle screen according to preset schedule information. Alternatively, if an operation function of a globular handler is scheduled to be performed as a default, the process skips step 303 and goes to step 305.

If the power is supplied and a specific input signal is generated, the controller 160 may determine whether the input signal is an input signal for requesting an operation function of a globular handler (303). If not, the controller 160 may control such that a user function is performed according to a corresponding input signal (305). For example, when the input signal is an input for supporting a flash function of the terminal 100, the controller 160 may control a separately provided light emitting lamp to support a flash function. Note that the controller 160 may perform various user functions such as a broadcasting receiving function, a call function, a game function, a messenger function, and a web search function according to a type of the generated input signal.

When the input signal for requesting an operation function of a globular handler at step 303 or the operation function of the globular handler is supported as a default function as described above, the controller 160 may proceed to step 307 where the controller 160 may support a screen arrangement for supporting an operation function of the globular handler (307). In detail, the controller 160 outputs a globular handler region at one end of a screen and displays a link object information thereon at another end of the screen. The controller 160 may output an indicator region including indicators capable of changing or controlling link objects outputted on the globular handler region on the display unit 140 according to a predetermined design scheme. The link object information region includes at least one link object information corresponding to at least one link object included in a globular handler region.

When each region is outputted on the display unit 140, the controller 160 may control such that a touch valid region and a touch invalid region of the touch panel 143 are set. That is, the controller 160 may control such that a region of the touch panel 143 corresponding to a globular handler region is set to a valid region and a region of a touch panel 143 corresponding to a link object information region is set to an invalid region.

Meanwhile, the controller 160 may control such that the link object information region is set to a touch valid region according to output link object information characteristics, user setting or designer preferences. For example, when a specific user function is designed to be operated based on information outputted on a link object information region, at least a portion of the link object information region may be set as a touch valid region. When a plurality of link object information is outputted on the link object information region, a touch valid region may be set so that corresponding information may be scrolled.

Next, the controller 160 control output of preset link object information according to the output of a globular handler (309). When the globular handler is outputted on a globular handler region, a specific link object may be included in a globular handler currently outputted on the display unit 140 according to preset schedule information. Then, the controller 160 confirms a link object included in a globular handler outputted on the display unit 140 to collect information corresponding to the link object. The controller 160 may output the collected link object information on the link object information region. When a globular handler outputted on the display unit 140 includes a plurality of link objects, the controller 160 may control link object information corresponding to the output of a link object set in default according to preset schedule information. The controller 160 may control such that a specific text set in default without the output of separate link object information, for example, a text corresponding to "link object selection request" is outputted on a link object information region. The controller 160 may output an image extending a globular handler region currently outputted on the display unit 140 on a link object information region. While a touch event occurs in a globular handler to rotate a globular handler in a predetermined direction, the globular handler enlarging image is applied, so that the display unit 140 may output a rotated globular handler enlarging image.

Thereafter, the controller 160 determine whether an input signal corresponding a control operation of the globular handler (311). At step 311, when a control operation of the globular handler, for example, a touch operation or an approach operation to a predetermined location of the display unit 140 is generated, the controller 160 may control update of link object information according to a control operation (313). When a link object outputted on the display unit 140 is changed according to an operation of a globular handler, that is, when another link object is outputted to the globular handler, the controller 160 may control collection of link object information with respect to a corresponding link object. The controller 160 may automatically output the collected link object information on a link object information region. When the globular handler temporarily stops an operation, the controller 160 may control the update of a link object information region based on information corresponding to a link object outputted on the display unit 140 in a stopped state of the globular handler. The controller 160 may update link object information with respect to link objects which are outputted and then removed on the display unit 140 while the globular handler is operating. If an input signal for performing a specific user function based on link object information is generated, the controller 160 may perform a user function according to a corresponding input signal. When a globular handler control input signal is not generated at step 311, step 313 may be skipped.

Subsequently, the controller 160 determines whether an input signal for terminating the terminal 100 is generated (315). When the input signal for terminating the terminal 100 is not generated, the process returns to step 303 and repeats the foregoing procedures.

As described above, a method of supporting an operation function of a globular handler according to the embodiment of the present invention allows a user to intuitively, rapidly, and conveniently search various link objects using a globular handler so that the terminal 100 may user-friendly provide a supportable user function.

Figure 4:
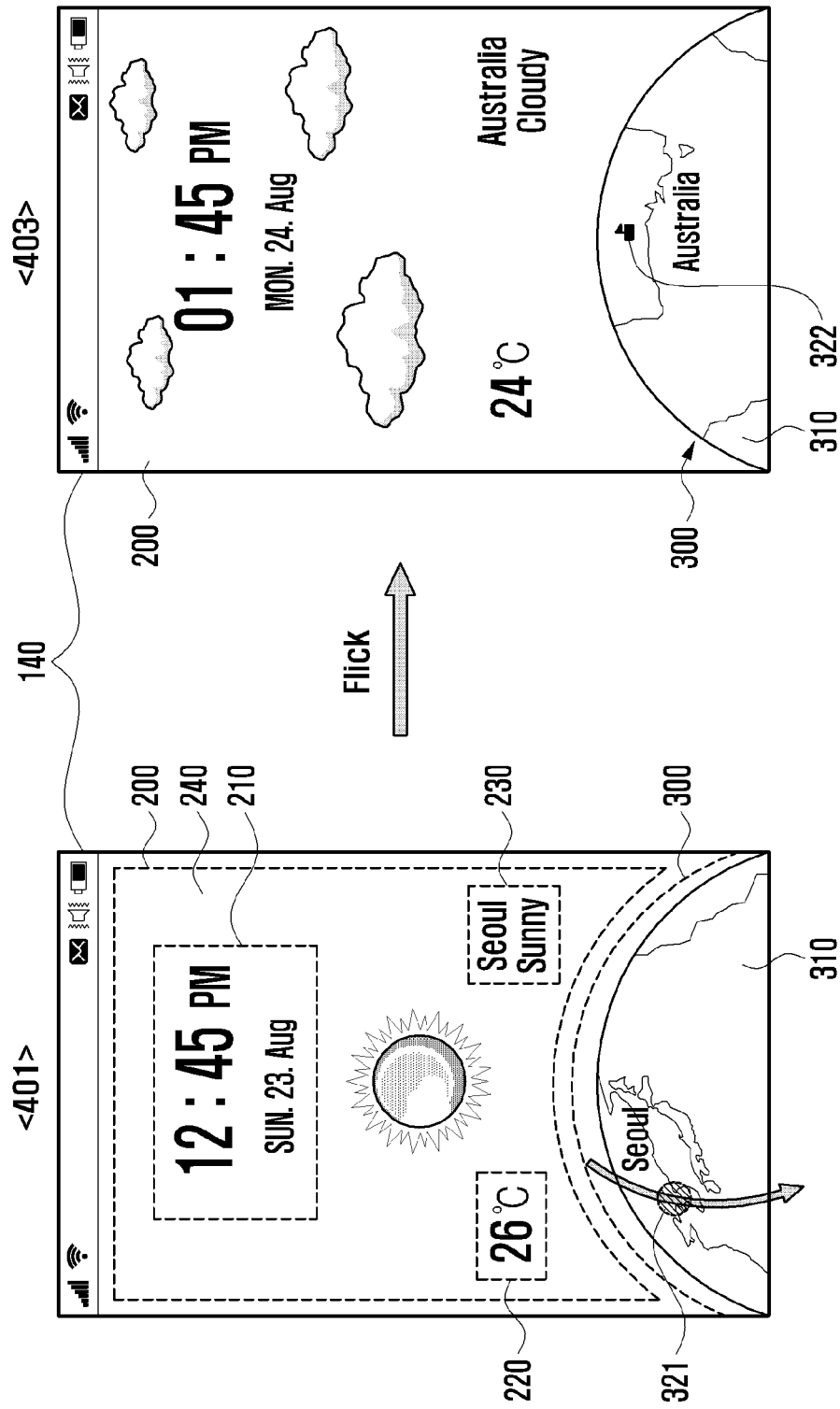
FIG. 4 is an exemplary diagram of a screen for illustrating an operation function of a globular handler according to a first embodiment of the present invention.

FIG. 4 is an exemplary diagram of a screen for illustrating an operation function of a globular handler according to a first embodiment of the present invention.

Referring to FIG. 4, a display unit 140 of a terminal 100 supporting an operation of a globular handler of the present invention may output a link object information region 200 and a globular handler region 300. For illustrative purposes, an operation function of a globular handler relates to providing weather information.

Particularly, as illustrated in a screen 401, a link object information region 200 may include a first link object information region 210, a second link object information region 220, a third link object information region 230, and a background region 240.

The first link object information region 210 is a region of outputting current time information. Today weather and current time information may be outputted on the first link object information region 210. The time information outputted on the first link object information region 210 is current time information corresponding to the first link object 321 outputted on a globular handler 310. Accordingly, when the first link object 321 outputted on the globular handler 310 is changed according to user control, the first link object information region 210 may be updated to new current time information according to the second changed link object 322. To update time information, the controller may operate a program calculating a time of a location corresponding to the first link object 321 or may receive the updated time information of a corresponding location from a web server.

The second link object information region 230 is a region of outputting current temperature information. The current temperature information may be temperature information at a location corresponding to the first link object 321. To output the temperature information, the controller 160 may collect the temperature information during a predetermined period or in real time at the new location. To this end, the controller 160 may form a communication channel with a web server providing the temperature information and receive the temperature information from a corresponding server. When a current location of the terminal corresponds with a displayed location and a temperature sensor is provided, the controller 160 may collect and output current temperature information using a corresponding temperature sensor.

The third link object information region 230 may be a region on which information indicating the first link object 321 is outputted and a region on which information indicating the background region 240 is outputted. For example, when the first link object 321 of the globular handler 310 is a location corresponding to "seoul", text information corresponding to the "seoul" may be outputted on the third link object information region 230. Further, text information corresponding to current weather information of a corresponding zone may be outputted on the third link object information region 230. The text information corresponding to weather information may be information matching with an image of the background region 240.

The background region 240 is a region on which a background image associated with weather information is outputted. An image corresponding to information indicating weather among information indicated in the third link object information region 230 may be outputted on the background region 240. In detail, when text information associated with weather of "sunny" is outputted on the third link object information region 230, a background image corresponding to the text information may be outputted on the background region 240. To achieve this, the memory 150 may previously store a plurality of weather images as a look up to be outputted on the background region 240 and update the weather images according to currently collected background region indication information or background region indication information on the third link object information region 230.

Substantially, information corresponding to a specific user function associated with the first link object 321 outputted on the globular handler 310 is output on the foregoing link object information regions 210, 220, and 230 and the background region 240. That is, the information outputted on the link object information regions 210, 220, and 230 and the background region 240 may be information associated with a user function provided from the terminal 100 and set by user associated with a specific point indicated by the first link object 321.

The globular handler region 300 may include a globular handler 310 and a first link object 321.

The globular handler 310 may be outputted and configured by at least a part of globular objects. The globular handler 310 is outputted in the globular handler region 300 and may have a plurality of connected surfaces or curved surface to support a three-dimension effect. The globular handler 310 may be implemented to be rotated in a predetermined direction according to a generated touch event or a control input signal. Accordingly, when the user generates a drag event or a flick event in a predetermined direction on a touch panel 143 on which the globular handler 310 is outputted. In this case, rotation speed and amount of the globular handler 310 may be controlled according to speed and a span of the drag event or the flick event.

The first link object is an object outputted on at least one point on the globular handler 310, and the link object is linked with information associated with a specific user function. Accordingly, when the first link object 321 is outputted, is outputted and then indicated, or indicated and then selected on the display unit 140 in a preset scheme, information output associated with a corresponding user function may be performed on the link object information region 200. The first link object 321 may be provided to a specific point of the globular handler 310, be outputted on the display unit 140 according to an operation of the globular handler 310, or be removed from the display unit 140 and be updated to a second link object 322 different from the first link object 321.

As shown in FIG. 4, a first one link object 321 is outputted in the globular handler 310, but the present invention is not limited thereto. That is, a plurality of link objects may be outputted in the globular handler 310. When a plurality of link objects is outputted in the globular handler 310, the display unit 140 may output information corresponding to one link object on the link object information region 200. If another link object is indicated or selected according to instruction or selection of the user, information with respect to a corresponding link object may be updated. The display unit 140 may divide a screen of the object information region 200 and output link object information with respect to respective link objects on the divided screens.

For example, if a specific touch event, for example, a flick touch event for rotating the globular handler 310 in a predetermined direction in the globular handler region 300, information of a link object information region 200 may be updated as illustrated in a screen 403. In detail, if the globular handler 310 rotates in a predetermined direction in a predetermined location, the controller 160 may automatically control such that a second link object 322 is selected according to at least one of a rotating direction and a rotating degree of the globular handler 310. The controller 160 may control such that the second selected link object 322 is outputted on a predetermined region of the globular handler 310, and a link object information region 200 is updated using link object information corresponding to the second output link object 322. To this end, the controller 160 may collect a plurality of link objects, and sequentially outputs the collected link objects to a predetermined point of the globular handler 310 according to generation of the touch event. In particular, the controller 160 may match the globular handler 310 and the link objects with a map image, and output another link object and update link object information according to location change while rotating the globular handler 310 according to the rotating direction and the rotating degree.

Figure 5:
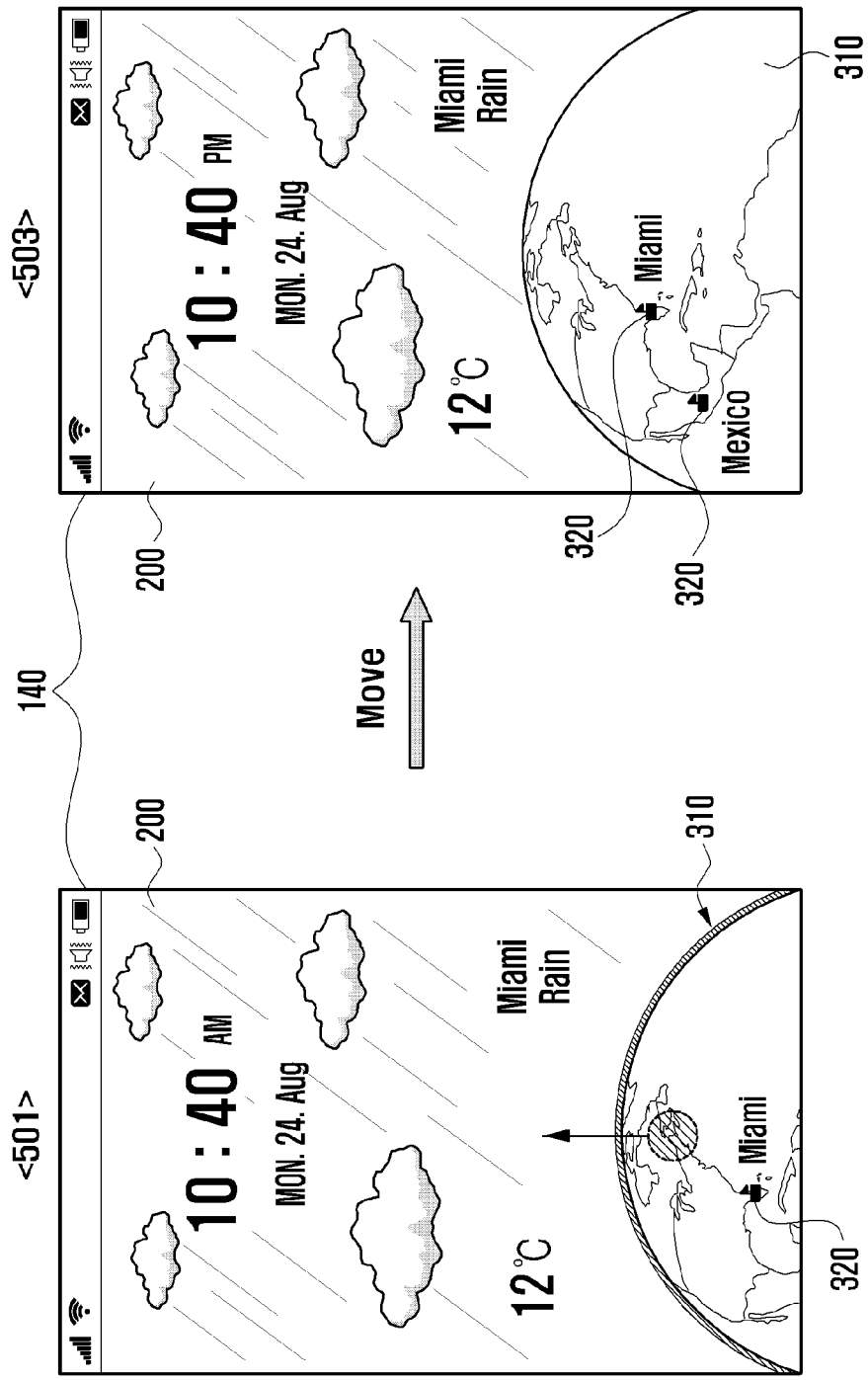
FIG. 5 is a diagram illustrating a location change function of a globular handler according to an exemplary embodiment of the present invention.

FIG. 5 is a diagram illustrating a location change function of a globular handler 310 according to an exemplary embodiment of the present invention.

Referring to FIG. 5, if a control operation for changing a location of the globular handler 310 is generated, the controller 106 may control the size outputted on the display unit 140 of the globular handler 310. To this end, the terminal 100 may include an input unit 110 for generating an input signal for location change of the globular handler 310 or a display unit 140 for selecting a menu. If an input signal or a menu selection for changing a location of the globular handler 310 is generated, the controller 160 may change a mode to a mode capable of moving a location of the globular handler 310. If a change location of the globular handler 310 is designated according to user designation, the controller 160 may move the globular handler 310 to a designated location.

In this case, a display form or range of the globular handler 310 may be changed as illustrated in FIG. 5. In detail, in a state that a portion of a top end of the globular handler 310 is outputted as illustrated in a screen 501, if the user changes a location of the globular handler 310 to move the globular handler 310 to an upper direction, the controller 160 is controlled such that the globular handler 310 may be displayed more as illustrated in a screen 503. A display region of the globular handler 310 outputted on the display unit 140 may be relatively extended as comparison with a previous region. The number of link objects 320 outputted on the globular handler 310 may be changed. As such, additional link objects 320 may be simultaneously outputted on the globular handler 310.

Meanwhile, as an occupied area of the globular handler 310 in the display unit 140 is increased, the size of the link object information region 200 may be relatively reduced. Accordingly, the size of information outputted from the link object information region 200 may be adjusted or maintained as and the location change may be applied and outputted. A part of a plurality of information to be outputted on the link object information region 200 may be omitted and remaining information may be outputted.

In the same manner as in location motion of the globular handler 310, a location of an indicator region may be moved together along with the location motion of the globular handler 310 by performing a function of indicating a link object group outputted on the globular handler 310. When a control operation for changing locations of a globular handler 310 corresponding to a three-dimensional handler and the indicator region is performed, the controller 160 may control change of the size outputted on the display unit 140 of the globular handler 310 and location change of the indicator region according to a change in the globular handler size.

Figure 6:
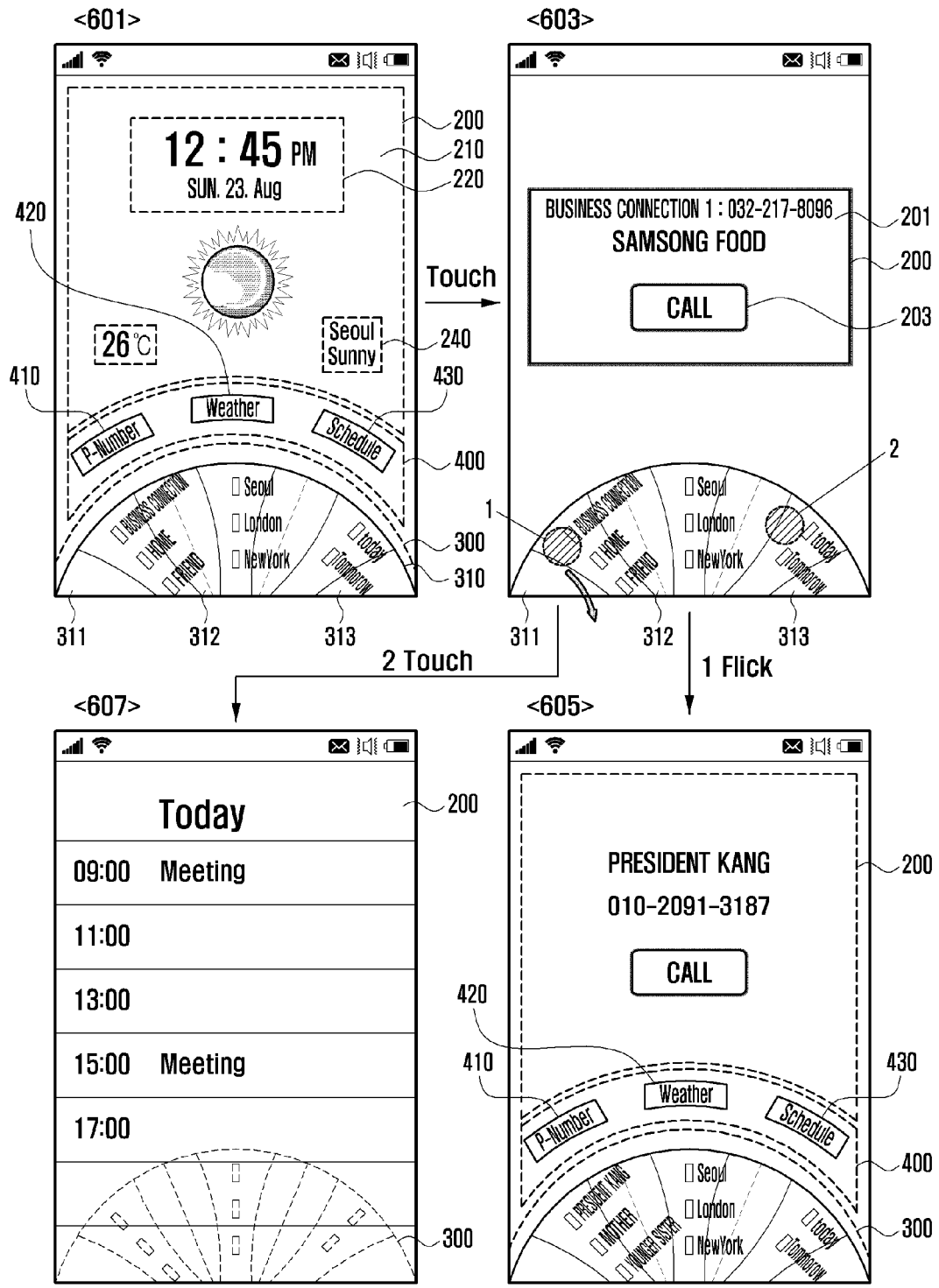
FIG. 6 is an exemplary diagram of a screen for illustrating support of a globular handler operation according to a second embodiment of the present invention.

FIG. 6 is an exemplary diagram of a screen for illustrating an operation function of a globular handler according to a second embodiment of the present invention.

Referring to FIG. 6, a display unit 140 according to an operation function of a globular handler of the present invention may include a globular handler region 300, an indicator region 400, and a link object information region 200 as illustrated in a screen 601. A screen output according to the operation function of the globular handler of the display unit 140 may be provided as a default function of the terminal 100 in the initial screen when the power is on.

The globular handler region 300 may include a globular handler 310 and at least one link 311, 312, and 313. The globular handler 310 is manufactured and displayed as a globular object and may rotate in a predetermined direction under control of the touch panel 143. A partial region of a total globular shape in the globular handler 310 of the present invention may be outputted to one end, for example, at a bottom end of the display unit 140. Further, image processing for perspective display of the link object groups 311, 312, and 313 may be performed on the globular handler 310.

As shown in FIG. 6, at least one link object groups 311, 312, and 313 may be outputted to a predetermined location of the globular handler to include a plurality of link objects. The link object groups 311, 312, and 313 may include link objects associated with indicators 410, 420, and 430 outputted on the indicator region 400. Link objects included in the same group may be arranged in the same image. Information about link objects included in the link object groups 311, 312, and 313 may be provided as a text.

The indicator region 400 is a region on which indicator 410, 420, and 430 as at least one of texts or icons and images defining characteristics of a user function are outputted. That is, when the user function is a weather information providing function, an indicator is displayed as a text "weather" corresponding thereto. When the user function is a message function, the indicator may be displayed as an icon.

FIG. 6 illustrates that first to third indicators 410, 420, and 430 are outputted on the indicator region 400. For example, the first to third indicators 410, 420, and 430 may be a phone-book indicator, a weather indicator, and a schedule indicator. The first to third indicators 410, 420, and 430 may be outputted to a location associated with the link object groups 311, 312, and 313 outputted to the globular handler 310. For example, the first to third indicators 410, 420, and 430 may be outputted to an indicator region 400 parallel to images which the link object groups 311, 312, and 313 output. The indicator region 400 may be changed under the control of the user. For example, when the user generates a touch event touching the indicator region 400 and then moving it in a left or right direction, the indicator region 400 may update indicators outputted on a corresponding region to new indicators. To this end, the terminal 100 stores an indicator list in the memory 150 and outputs at least one specific indicator on the indicator region 400 according to previous setting.

As described above, a touch event for updating an indicator is generated in the indicator region 400, the controller 160 may output stored other indicators on the indicator region 400 according to the touch event. Meanwhile, if indicators are updated in the indicator region 400, the link object groups 311, 312, and 313 outputted on a region of the globular handler 310 may also be changed according to update of the indicator. For example, the terminal 100 may include various indicators such as a phone-book indicator, a weather indicator, a schedule indicator, an image indicator, a message indicator, a call list indicator, a web access list indicator, and a stock list indicator. If a touch event for updating the indicator region 400 is generated in a state that the phone-book indicator, the weather indicator, and the schedule indicator are outputted as the first to third indictors 410, 420, and 430, the controller 160 may replace at least one of the phone-book indicator, the weather indicator, and the schedule indicator by another indicator. When the indicators are replaced, the link object groups 311, 312, and 313 output link objects corresponding to the replaced indicators on a region of the corresponding globular handler 310. For example, if the phone-book indicator is changed to the stock list indicator, respective link objects of the first link object group 311 may be replaced by link object items corresponding to the stock list indicator.

Locations of the indicators may be changed in the indicator region 400 under the control of the user. To achieve this, the terminal may support a menu or specific mode for changing locations of indicators at the indicator region 400. If an event for changing locations of the indicators in an active state of a corresponding mode, the controller 160 may change the locations of indicators according to an event. If the locations of the indicators are changed, locations of the link object groups 311, 312, and 313 on the globular handler 310 may be also changed. The locations of the indicators may be changed in the indicator region 400. If update or location change of the indicators occurs in the indicator region 400, the controller 160 may change at least on link object group on the globular handler corresponding to the three-dimensional handler to a link object group corresponding to updated indicators or indicators whose location is changed or change a location of the at least on link object group.

The indicator region 400 may be outputted in a displayed state according to a user request in a temporarily transparent state. Particularly, an indicator is outputted on the indictor region 400 for a predetermined time in an initial activated time point of the operation function of the globular handler. If the predetermined time elapses, the indicator may be removed from the display unit 140 or maintain a current state before generating a separate input signal. The indicator region 400 may be temporarily removed from the display unit 140 when the touch event is generated on the globular handler 310. When the touch event on the globular handler 310 is released, the indicator region 400 may be outputted on the display unit 140.

While the indicator region 400 is removed from the display unit 140, the link object information region 200 may temporarily extend to the indicator region 400 and be operated. Next, when the indicator region 400 is again outputted on the display unit 140, the link object information region 200 may be resized to the size corresponding to an output state of the indicator region 400 or be overlaid and outputted on the link object information region 200 extended from the indicator region.

The link object information region 200 is a region on which link object information corresponding to at least one of link objects outputted to the globular handler 310 is outputted. As shown, the link object information region 200 may include first to third link object information regions 210, 220, and 230 and a background region 240. A screen 601 indicates information according to a state that a "Seoul" link object is selected in default is outputted on the link object information region 200. The "Seoul" link object may correspond to a first link object of the second link object group 312 corresponding to the second indicator 420.

The user may generate an event for instructing or selecting the first link object of the first link object group 311 corresponding to the first indicator 410 in the screen 601. Then, the controller 160 may output link object information corresponding to the first selected link object as illustrated in a screen 603 on the link object information region 200. For example, the display unit 140 may output first link object information 201 corresponding to "business connection 1". In this case, the controller 160 may output a predetermined function button 203 at one side of the display unit 140 such that a user function supported from the first indicator 410 through the first link object information 201 may be directly operated. The function button 203 may be a call connection button because the link object is a phone-book relation link object. The screen 603 illustrates that the link object information region 200 includes one link object information 201 region and one function button 203 region.

Assuming that the touch event is generated on the globular handler 310 in the screen 603, an indicator region is removed from a screen according to selection of the first link object. If a corresponding touch event is released after the touch event is generated on the globular handler 310, the indicator region 400 may be again outputted at one side of the display unit 140. In this case, the controller 160 may control such that the indicator region 400 is outputted just after release of the touch event or after a predetermined time elapses.

Meanwhile, the user may wish to search desired other link object among link objects corresponding to a phone-book indicator. Then, the user may generate a drag event or a flick event which rotates a globular handler 310 in a predetermined direction in a state of maintaining a touch event selecting the first link object in the screen 601. In this case, the user may generate a touch event based on an image of a first link object group 311 including the first link object.

Then, the globular handler 310 may rotate in a predetermined direction according to the touch event. The globular handler 310 may rotate according to the touch event to replace link objects included in the first link object group 311 outputted on the globular handler 310 by other link objects included in a corresponding group. While another link object is selected or stops at a previously defined location, for example, a current location of the first link object, link object information corresponding to another link object may be outputted on the link object information region as illustrated in the screen 605. When another link object is a "president Kang", the display unit 140 may output information corresponding to a "president Kang" link object as illustrated in a screen 605. Meanwhile, if a touch event release corresponding to another link object search completion is generated, the controller 160 may again output the indicator region 400 on the display unit 400 as shown. Then, the user may direction move to a desired specific user function by selecting a specific indicator of the indicator region 400.

The user may wish to use a detailed function of a corresponding user function. To do this, the user may generate an input signal for calling the detailed function based on a link object group of a region of the indicator or a globular handler 310. For example, the user may generate a specific gesture event such as a long-press or a double tap on a region which the indicator or the link object groups are outputted. Then, the controller 160 may control the display unit 140 to output a detailed function screen of the user function according to generation of a corresponding event. For example, when the user long-presses the phone-book indicator, the controller 160 may control such that a total screen of the display unit 140 is switched to a phone-book search screen.

Meanwhile, the user may select a link object included in another link object group, for example, a first link object included in the third link object group 313 corresponding to a third indicator 430 from the screen 603. Then, the controller 160 may collect link object information corresponding to the first selected link object and output the collected link object information on a link object information region 200 as illustrated in a screen 607. In this case, if a touch event selecting the first link object is released, the controller 160 may remove the indicator region 400, remove the globular handler 310 from the display unit 140, or process the globular handler 300 in a semitransparent state. Then, the user may minutely confirm the first selected link object, for example, today schedule information. When an operation of other indicators or the globular handler 310 is required, the user may approach a touch object to a location in which the globular handler 310 is removed or a globular handler 310 in the semitransparent state. Accordingly, the controller 160 may control such that a globular handler 310 is displayed as an original state according to approach or contact of the touch object. In this case, the controller 160 may output the indicator region 400 and the globular handler 310 to have a preset color, light and darkness, and form based on approach of a touch object generated on the globular handler 310 and the touch event.

In addition, a touch drag or a flick event may be generated on the link object information region 200. The controller 160 may recognize a corresponding touch event as a touch event for updating the link object information region 200, and update the link object information region 200. If a touch drag or a flick event is generated on a display unit 140 of the link object information region 200 of a screen 603, the controller 160 may output information such as a link object information region 200 of a screen 605. The controller 160 may control such that the globular handler 310 is rotated to change link objects outputted on the link object group. As a result, rotation of the globular handler and update of at least one link object or at least one link object group may be achieved according to a touch operation generated on the display unit 140 of the link object information region 200. That is, the controller 160 may control such that link object information is updated according to generation of a preset control operation in the link object information region 200. When the link object information is updated, the controller 160 may update at least one link object outputted on the globular handler corresponding to the updated link object information.

If the touch drag or the flick event is generated in only the first link object group 311 in the screen 603, only a corresponding region rotates, and the second link object group 312 and the second link object group 313 may maintain a current state without rotation.

Meanwhile, the foregoing embodiment has illustrated that the handler has a globular shape, but the present invention is not limited thereto. That is, as shown in FIG. 7, the globular handler may be replaced by a handler of another form having a three-dimension effect. The handler may be provided to be selected according to tastes of the user.

Referring to FIG. 7, the globular handler of the present invention may be replaced as polyhedral handler such as a hexagonal or tetrahedral handler as illustrated in screens 701 to 730. An object having a three-dimensional effect, for example an object of various forms such as a ball, a bottle, and water melon is applicable to the handler.

Accordingly, it will be appreciated that the globular handler of the present invention is not limited to a globular shape but is applicable to an object handler having a three-dimensional effect rotatable based one a predetermined axis according to a touch input of the user.

As mentioned above, in the method of operating a three-dimensional handler and a terminal supporting the same according to the embodiment of the present invention, the user may rapidly and easily approach various user functions using a sensitive handler in an operation of the terminal. Accordingly, the present invention may provide convenience together with diversity of an operation of the terminal while satisfying various user needs.

The foregoing terminal 100 may further include various additional modules according to provision forms. That is, when the mobile terminal is a communication terminal, it may include constructions that are not mentioned such as a near distance communication module for near distance communication, an interface exchanging data in a wired communication scheme or a wireless communication scheme of the terminal 100, an Internet communication module communicating with an Internet to perform an Internet function, and a digital broadcasting module receiving and broadcasting digital broadcast. Since the structural elements can be variously changed according to convergence trend of a digital device, no elements can be listed. However, the terminal 100 may include structural elements equivalent to the foregoing structural elements. Further, the terminal of the present invention may be substituted by specific constructions in the foregoing arrangements according to the provided form or another structure. This can be easily understood to those skilled in the present art.

The terminal 100 according to the embodiment of the present invention may include various information communication devices and multi-media devices such as a Portable Multimedia Player (PMP), a digital broadcasting player, a Personal Digital Assistant (PDA), a music player (e.g., MP3 player), a portable game terminal, a Smart Phone, a Notebook computer, and a handheld PC as well as various mobile communication terminals operating according to communication protocols corresponding to various communication systems.

As mentioned above, in the method of operating a three-dimensional handler and a terminal supporting the same according to the embodiment of the present invention, the present invention may induce interest and concentration during search of information through an operation of a sensitive handler so that the information search may be intuitively performed.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A terminal for supporting an operation of a three-dimensional handler, comprising:
 a display unit displaying:
  the three-dimensional handler in a three-dimensional handler region, the three-dimensional handler including link objects categorized in link object groups partitioning the three-dimensional handler, and a link object information region outputting a link object information corresponding a selected link object, and an indicator region interposed between the three-dimensional handler region and the link object information region, the indicator region including indicators each corresponding to one of the categorized link object groups displayed on the three-dimensional handler, such that each indicator in the indicator region is aligned with a corresponding link object group on the three-dimensional handler; and a controller for:

collecting the link object information in response to a movement of the three-dimensional handler or a selection of one of the link objects on the three-dimensional handler and outputting the collected link object information in the link object information region, and removing the indicator region and the indicators from display in response to detecting an input to one of the link object groups, wherein the controller is configured to determine whether a corresponding user function requires updating of the link object information in real time or during a predetermined time period and to update the link object information region based on the determination, and wherein the three-dimensional handler comprises a border having a curvature, and at least one indicator is aligned with another indicator in the indicator region along an arc defined by the curvature.

2. The terminal of claim 1, wherein the three-dimensional handler is selectively rotated in a predetermined direction according to a touch operation and displays a plurality of link objects on the three-dimensional handler as being rotated, and wherein each link object group is aligned along a radius of the three-dimensional handler corresponding to the curvature to align with a corresponding indicator of the indicator region.

3. The terminal of claim 2, wherein the link object information region provides one of:

a background image corresponding to the at least one of the link objects;

a plurality of link object information corresponding to at least one of the link object groups; and a function button for executing at least one of the link object information corresponding to the at least one of the link objects.

4. The terminal of claim 2, wherein the controller changes a size of the three-dimensional handler outputted on the display unit when a control operation for changing a location of the three-dimensional handler is requested.

5. The terminal of claim 2, wherein the controller updates link object information according to generation of a preset touch operation in the link object information region, and updates a link object outputted on the three-dimensional handler corresponding to the updated link information when the link object information is updated.

6. The terminal of claim 1, wherein the indicators define user function characteristics of a plurality of link objects forming a link object group.

7. The terminal of claim 6, wherein the controller:

in response to detecting an input switching a displayed indicator to a new indicator in the indicator region, removes the plurality of link objects from display in the three-dimensional handler region, and controls the display unit to display a new plurality of link objects forming a second link group corresponding to the new indicator.

8. The terminal of claim 1, wherein, in response to the input to the one of the link object groups, the link object information region is expanded to include a portion of the display unit from where the indicator region and the indicators are removed, and wherein the three-dimensional handler is temporarily removed from the display unit or is displayed on the display unit in a semitransparent state in response to detecting a release of the input to the one of the link object groups.

9. The terminal of claim 8, wherein when a touch object approaches or a touch event occurs in an output location of the three-dimensional handler, the display unit redisplays the temporarily removed three-dimensional handler, or reverts the three-dimensional handler in the semitransparent state back to an original state.

10. The terminal of claim 1, further comprising a communication unit forming a communication channel for receiving the link object information from a specific server or another terminal.

11. The terminal of claim 1, wherein the controller is further for:

after the indicator region and the indicators are removed from display, detecting a drag input in the link object information region; and in response to the drag input detected in the link object information region, switching display of the link object information to new link object information and updating at least one link object group within the three-dimensional handler to correspond to the new link object information.

12. A method for operating a three-dimensional handler, the method comprising:

displaying the three-dimensional handler in a three-dimensional handler region disposed at a first end of a display unit, the three-dimensional handler including link objects categorized in link object groups partitioning the three-dimension handler;

displaying a link object information region having a link object information corresponding to a selected link object at a second end of the display unit opposite the first end;

displaying an indicator region interposed between the three-dimensional handler region and the link object information region, the indicator region including indicators each corresponding to one of the categorized link object groups displayed on the three-dimensional handler, such that each indicator in the indicator region is aligned with a corresponding link object group on the three-dimensional handler;

displaying a new link object information in response to a movement of the three-dimensional handler or a selection of one of the link objects on the three-dimensional handler;

determining whether a corresponding user function requires updating of the link object information in real time or during a predetermined time period and updating the link object information based on the determination; and removing the indicator region and the indicators from display in response to detecting an input to one of the link object groups, wherein the three-dimensional handler comprises a border having a curvature, and at least one indicator is aligned with another indicator in the indicator region along an arc defined by the curvature.

13. The method of claim 12, wherein the three-dimensional handler is selectively rotated in a predetermined direction according to a touch operation and displays a plurality of link objects on the three-dimensional handler as being rotated, and wherein each link object group is aligned along a radius of the three-dimensional handler corresponding to the curvature to align with a corresponding indicator of the indicator region.

14. The method of claim 13, further comprising:

controlling a size of the three-dimensional handler outputted on the display unit in response to a location change of the three-dimensional handler.

15. The method of claim 13, further comprising:

updating link object information according to generation of a preset touch operation in the link object information region; and updating a link object outputted on the three-dimensional handler corresponding to the updated link information when the link object information is updated.

16. The method of claim 12, wherein the indicators define user function characteristics of the link objects forming one of the link object groups.

17. The method of claim 16, further comprising:

temporarily removing the indicator region from the display unit when a control operation for controlling the three-dimensional handler is generated.

18. The method of claim 16, further comprising:

generating a control operation for changing locations of the three-dimensional handler and the indicator region; and controlling a size of the three-dimensional handler on the display unit according to the generation of the control operation and changing a location of the indicator region according to the control of the size of the three-dimensional handler.

19. The method of claim 16, further comprising:

updating the indicators or changing locations of the indicators in the indicator region; and updating the link object group on the three-dimensional handler to a link object group corresponding to updated indicator or indicators which location is changed or changing a location of one of the link object groups.

20. The method of claim 16, further comprising:

in response to detecting an input switching a displayed indicator to a new indicator in the indicator region, removing the link objects from display in the three-dimensional handler region, and displaying a new plurality of link objects forming a second link group corresponding to the new indicator.

21. The method of claim 12, wherein, in response to the input to the one of the link object groups, the link object information region is expanded to include a portion of the display unit from where the indicator region and the indicators are removed, the method further comprising:

temporarily displaying the three-dimensional handler on the display unit in a semitransparent state in response to detecting a release of the input to the one of the link object groups.

22. The method of claim 21, further comprising:

detecting a touch object approaches or a touch event occurs in an output location of the three-dimensional handler; and reverting the three-dimensional handler in the semitransparent state back to an original state.

23. The method of claim 12, further comprising receiving the link object information from a specific server or another terminal.

24. The method of claim 12, further comprising:

after the indicator region and the indicators are removed from display, detecting a drag input in the link object information region; and in response to the drag input detected in the link object information region, switching display of the link object information to new link object information and updating at least one link object group within the three-dimensional handler to correspond to the new link object information.

* * * * *